(12) United States Patent
Mock et al.

(10) Patent No.: US 7,910,200 B2
(45) Date of Patent: Mar. 22, 2011

(54) MULTILAYER FOAM COMPOSITE ELEMENT WITH RECESSES

(75) Inventors: Christof Mock, Mannheim (DE); Bernhard Vath, Mannheim (DE)

(73) Assignee: BASF AG, Ludwigshafen (DE)

( * ) Notice: Subject to any disclaimer, the term of this patent is extended or adjusted under 35 U.S.C. 154(b) by 93 days.

(21) Appl. No.: 12/282,449

(22) PCT Filed: Mar. 1, 2007

(86) PCT No.: PCT/EP2007/051932
§ 371 (c)(1),
(2), (4) Date: Sep. 10, 2008

(87) PCT Pub. No.: WO2007/104651
PCT Pub. Date: Sep. 20, 2007

(65) Prior Publication Data
US 2009/0011203 A1   Jan. 8, 2009

(30) Foreign Application Priority Data
Mar. 10, 2006 (EP) .................................. 06110922

(51) Int. Cl.
*B32B 3/26* (2006.01)
*B32B 3/30* (2006.01)
(52) U.S. Cl. ............... 428/316.6; 428/315.5; 428/315.7; 428/131
(58) Field of Classification Search ............... 428/315.5, 428/315.7, 316.6, 131
See application file for complete search history.

(56) References Cited

U.S. PATENT DOCUMENTS
| | | | |
|---|---|---|---|
| 6,789,645 B1 | 9/2004 | Deblander | |
| 7,040,575 B2 * | 5/2006 | Struve et al. | 244/118.5 |
| 7,114,621 B2 * | 10/2006 | Hester et al. | 210/490 |

FOREIGN PATENT DOCUMENTS
| | | |
|---|---|---|
| DE | 3513662 | 10/1986 |
| EP | 1336695 | 8/2003 |
| WO | WO-2005095206 | 10/2005 |

OTHER PUBLICATIONS

U.S. Appl. No. 11/921,611, filed Dec. 6, 2007.
U.S. Appl. No. 12/064,349, filed Sep. 15, 2008.
U.S. Appl. No. 12/063,946, filed Feb. 15, 2008.
U.S. Appl. No. 12/376,808, filed Feb. 9, 2009.
U.S. Appl. No. 12/377,215, filed Feb. 11, 2009.
U.S. Appl. No. 12/466,536, filed May 15, 2009.
U.S. Appl. No. 12/517,703, filed Jun. 4, 2009.
U.S. Appl. No. 12/526,422, filed Aug. 7, 2009.
U.S. Appl. No. 12/526,412, filed Aug. 7, 2009.
U.S. Appl. No. 12/526,404, filed Aug. 7, 2009.
U.S. Appl. No. 12/281,936, filed Sep. 5, 2008.

(Continued)

*Primary Examiner* — Hai Vo
(74) *Attorney, Agent, or Firm* — Connolly Bove Lodge & Hutz LLP

(57) ABSTRACT

A multilayer foam composite element whose total thickness d comprises at least three layers composed of an open-cell foam, where at least one of the internal layers has recesses and the two outermost layers have no recesses, wherein
  i) the volume of the recesses in the internal layer having recesses is from 20 to 70% by volume, and
  ii) the thickness of the layer having recesses is from 20 to 80% of the total thickness d.

20 Claims, 2 Drawing Sheets

OTHER PUBLICATIONS

Figure 1:
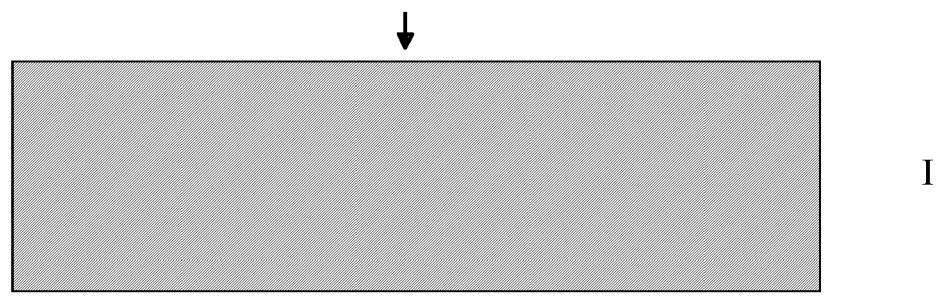
Figure 1:
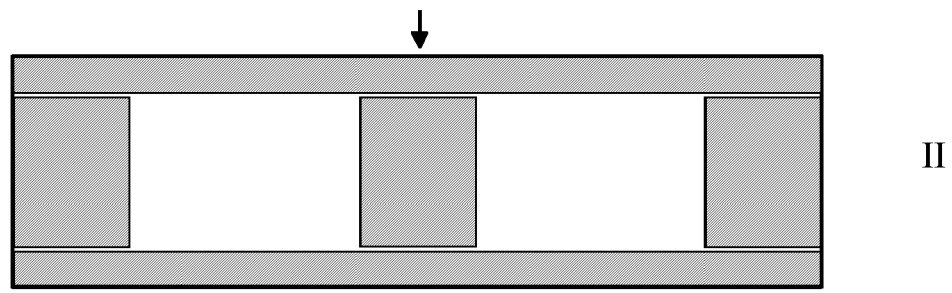
Figure 1:
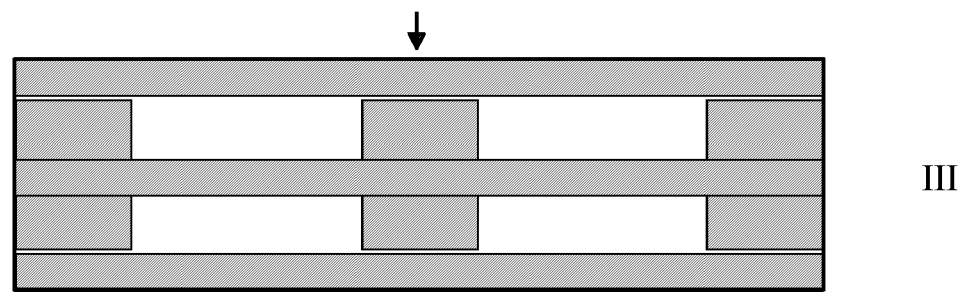
Figure 1:
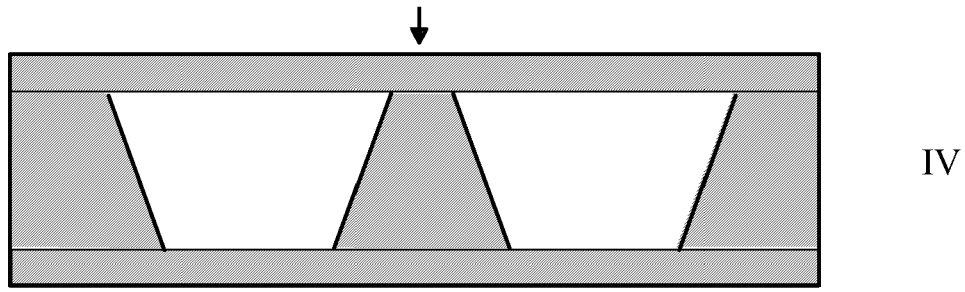

U.S. Appl. No. 12/294,712, filed Sep. 26, 2008.
U.S. Appl. No. 12/294,813, filed Sep. 26, 2008.
U.S. Appl. No. 12/226,410, filed Oct. 17, 2008.
U.S. Appl. No. 12/373,168, filed Jan. 9, 2009.
U.S. Appl. No. 12/279,566, filed Aug. 15, 2008.
U.S. Appl. No. 12/526,430, filed Aug. 7, 2009.

* cited by examiner

I

II

III

IV

MULTILAYER FOAM COMPOSITE ELEMENT WITH RECESSES

This application is a national phase of PCT/EP2007/051932, filed on Mar. 1, 2007 which claims priority to EP 06110922.9 filed Mar. 10, 2006, the entire contents of all are hereby incorporated by reference.

The invention relates to a multilayer foam composite element whose total thickness d comprises at least three layers composed of an open-cell foam, where at least one of the internal layers has recesses and the two outermost layers have no recesses, wherein
  i) the volume of the recesses in the internal layer having recesses is from 20 to 70% by volume, and
  ii) the thickness of the layer having recesses is from 20 to 80% of the total thickness d.

The invention further relates to the use of the composite elements according to claims 1 to 9 as sound-absorbing elements.

Open-cell foams, for example those based on melamine resins or on polyurethanes, are used as insulating elements (e.g. insulating layers, insulating sheets, or insulating webs) for thermal insulation and in particular also for sound-deadening, because their open-cell structure is effective in absorbing sound.

It is known that the insulating elements can be provided with recesses (cavities) to reduce weight—this being important for example for minimizing fuel consumption of vehicles and aircraft—or optimization of sound absorption. The terms recess and cavity are used synonymously in the present application.

For example, EP 1 336 695 A1 describes a sheet-like sound-deadening component whose surface facing toward the inner side of a room in a building has corrugations and grooves.

DE 35 13 662 A1 discloses a sound-deadening device composed of a foam web whose profile has rounded protuberances, that side of the web having rounded protuberances having been arranged to face away from the incident sound. There can be a foil covering on that side of the web having rounded protuberances. There is also a description of sound-deadening devices composed of at least two adjacent foam webs, each of whose profiles has rounded protuberances.

WO 2005/095206 A1 describes insulation systems for thermal and sound insulation of aircraft fuselages, these having been attached to the inner side of the fuselage between the frames and stringers. They have at least one layer composed of an open-cell, water-repellent foam, for example based on melamine, and one decorative outer layer (trim). FIG. 5 and paragraphs [0037] to [0041] of the description disclose a multilayer system composed of a first foam layer and of a second foam layer which has a fiber layer. The two layers have been connected to one another by way of spacers which are likewise composed of the foam, thus giving air-filled recesses (gaps) between the spacers. FIGS. 8 and 9 or paragraphs [0046] to [0053] describe other embodiments with a plurality of layers, where again each layer has spacers and intermediate recesses.

The sound-deadening elements of the prior art are not always satisfactory for demanding sound-absorption or weight-reduction applications.

It was an object to eliminate the disadvantages described. Another object was to provide improved composite elements composed of open-cell foam.

The composite elements should feature low weight and at the same time good sound absorption. In particular, the intention was to find composite elements in which the reduction in weight via introduction of recesses brings about a less-than-proportional reduction in sound absorption when comparison is made with a "solid" element without recesses.

Accordingly, the composite elements defined at the outset have been found, as also has their use as sound-absorbing elements. Preferred embodiments of the invention are found in the subclaims.

The foam of the composite element is an open-cell foam. The proportion of closed cells is usually at most 10%, preferably at most 5%. The open-cell foam has preferably been selected from a melamine resin foam, a polyurethane foam, and a polyimide foam.

A melamine resin foam preferably suitable is one of those composed of a condensate derived from melamine and formaldehyde, these also being termed melamine-formaldehyde resins, MF resins, or melamine resins. These elastic, open-cell melamine resin foams are known and are described by way of example in the specifications EP-A 17 671, 17 672, 37 470, and WO 01/94436.

Production of the melamine resin foam starts from a melamine-formaldehyde precondensate. The materials condensed into melamine-formaldehyde condensates can comprise not only melamine but also up to 50% by weight, preferably up to 20% by weight, of other thermoset-forming compounds, and not only formaldehyde but also up to 50% by weight, preferably up to 20% by weight, of other aldehydes. An unmodified melamine-formaldehyde condensate is particularly preferred. Examples of thermoset-forming materials that can be used are: alkyl- and aryl-substituted melamine, urea, urethanes, carboxamides, dicyandiamide, guanidine, sulfurylamide, sulfonamides, aliphatic amines, glycols, phenol, and its derivatives. Examples of aldehydes that can be used are acetaldehyde, trimethylolacetaldehyde, acrolein, benzaldehyde, furfurol, glyoxal, glutaraldehyde, phthalaldehyde, and terephthalaldehyde. Further details concerning melamine-formaldehyde condensates are found in Houben-Weyl, Methoden der organischen Chemie [Methods of organic chemistry], volume 14/2, 1963, pp. 319-402.

The molar ratio of melamine to formaldehyde is generally from 1:1.3 to 1:3.5, in particular from 1:1.6 to 1:3.1. The materials condensed into the melamine resins can moreover comprise sulfite groups, and this is achievable by way of example via addition of from 1 to 20% by weight of sodium hydrogensulfite during the condensation of the resin (see EP-A 37470).

The melamine-formaldehyde precondensate usually takes the form of a solution or dispersion, and is mixed with the usual additives required to produce a foam. These additives are in particular emulsifiers (anionic, cationic or non-ionic surfactants, e.g. alkyl sulfates) for emulsification of the blowing agent and for stabilization of the foam, and blowing agent (chemical or physical, e.g. pentane), for producing a foam from the melamine resin solution, and also hardeners (mostly acids, e.g. formic acid), which catalyze further condensation of the melamine resin.

By way of example, the additives are mixed in an extruder with the aqueous solution or dispersion of the melamine resin, and the blowing agent here can, if appropriate, also be injected under pressure. However, it is also possible to start from a solid, e.g. spray-dried melamine resin and then to mix this with an aqueous solution of the emulsifier, with the hardener, and also with the blowing agent. After the mixing process, the solution or dispersion is discharged through a nozzle and then immediately heated, e.g. via high-frequency irradiation at 2.45 GHz or via microwave irradiation, and thus foamed. The mixture, foaming as a consequence of temperature increase and of vaporization of the blowing agent, is, for example, molded to give a foam extrudate, which is cut to give slabs.

Further information concerning starting materials, such as emulsifiers, blowing agents, and hardeners, and further process details concerning melamine resin foam production are found by way of example in the abovementioned specifications WO 01/94436, EP-A 17 671, 17 672, and 37 470.

To produce the inventive foam composite elements, it is preferable to use melamine resin foams whose envelope density (to EN ISO 845) is from 3 to 50 kg/m$^3$, in particular from 7 to 15 kg/m$^3$. Suitable melamine resin foams are commercially available, for example as Basotect® from BASF.

Polyurethane foams are polyisocyanate polyaddition products. Polyurethanes here are also intended to mean other polyisocyanate polyaddition products, in particular polyisocyanurates or polyureas. Flexible, semirigid, or rigid, or else thermoplastic or crosslinked polyurethane grades are suitable for the inventive composite elements.

The production of the polyurethanes has been widely described and usually takes place via reaction of isocyanates a) with compounds b) reactive toward isocyanates under well-known conditions. The reaction is preferably carried out in the presence of catalysts c) and/or of auxiliaries d). If foamed polyisocyanate polyaddition products are involved, these are produced in the presence of conventional blowing agents e).

Isocyanates a) that can be used are the aromatic, arylaliphatic, aliphatic, and/or cycloaliphatic organic isocyanates known per se, preferably diisocyanates. Examples of compounds b) that can be used and are reactive toward isocyanates are well-known compounds whose molecular weight is from 60 to 10 000 and whose functionality with respect to isocyanates is from 1 to 8, preferably from 2 to 6 (functionality about 2 in the case of thermoplastic polyurethanes, TPUs), examples being polyols whose molecular weight is from 500 to 10 000, e.g. polyether polyols, polyester polyols, polyether polyester polyols, and/or diols, triols, and/or polyols whose molecular weights are smaller than 500.

Catalysts c) that can be used, if appropriate, for production of the products are well-known compounds which accelerate markedly the reaction of isocyanates with the compounds reactive toward isocyanates, and the total catalyst content used here is preferably from 0.001 to 15% by weight, in particular from 0.05 to 6% by weight, based on the weight of all of the compounds b) used that are reactive toward isocyanates; examples are tertiary amines and/or metal salts, for example inorganic and/or organic compounds of iron, of lead, of zinc, and/or of tin in the usual oxidation states of the metal.

Auxiliaries d) that can be used, if appropriate, are the additives mentioned in the next-but-one paragraph.

Details concerning polyurethanes, polyisocyanurates, and polyureas can be found by the person skilled in the art in Kunststoff-Handbuch [Plastics handbook], 3rd edition, volume 7 "Polyurethane" [Polyurethanes], Hanser Verlag, Munich 1993.

Polyimides are polymers whose repeat units have bonding via linear or cyclic imide groups. By way of example, they are prepared via polycondensation of aliphatic or aromatic diamines with aromatic tetracarboxylic dianhydrides (e.g. from 4,4'-oxy-dianiline and pyromellitic dianhydride) by way of polyamidecarboxylic acids as intermediates. The imide groups here are produced during the synthesis of the polymer. However, the condensation reaction does not proceed exclusively intramolecularly with cyclization but also proceeds intermolecularly. Because of the resultant crosslinking, which makes subsequent shaping processes more difficult, the shaping process (in this case foaming) is preferably conducted simultaneously with the ring-closure reaction. The water eliminated during cyclization can initiate problematic chain degradation, and the polyamidecarboxylic acid foams are therefore mostly saturated with water-binding acceptors prior to imidation. Crosslinking and hydrolysis can likewise be avoided by replacing the diamines with, for example, diisocyanates.

The two functionalities required for in-situ imide formation can also have been combined in a single monomer molecule, thus permitting not only AA-BB polyimides but also AB polyimides to be obtained, these having no crosslinking. Crosslinking during synthesis of the polyimide can also be avoided by using monomers which comprise previously formed imide groups. Examples of these monomers are bismaleimides, which are obtained from maleic anhydride and from diamines, these then being reacted via polyaddition with, for example, diamines, aldoximes, or disulfides, to give polyimides.

Other polyimides for the purposes of the invention are polymers which comprise not only imide groups but also amide groups (polyamideimides), ester groups (polyesterimides), or ether groups (polyetherimides).

Polyimide foam is foamed by means of conventional blowing agents in a manner known per se. Further details concerning polyimides are found by way of example in the electronic encyclopedia Lexikon Römpp Online, Version 2.8, Thieme-Verlag Stuttgart, 2006, key word "Polyimide" [Polyimides].

For many purposes it can be advantageous to add up to 20% by weight, preferably up to 10% by weight, based on the unfoamed polymer, of additives to the melamine resin foam, polyurethane foam, or polyimide foam. Examples of these additives are dyes, pigments, flame retardants, antioxidants, UV stabilizers, heat stabilizers, hydrolysis stabilizers, surfactants, substances having fungistatic and bacteriostatic action, agents for reducing the toxicity of fire gases or for promoting carbonization. It is also possible to make concomitant use of hydrophobicizers or oleophobicizers, cf. subsequent text. Additives of this type are known to the person skilled in the art and are available commercially.

The inventive foam composite element is a multilayer element and has at least three layers. All of the layers are composed of an open-cell foam. All of the layers are preferably either composed of the melamine resin foam described or of the polyurethane foam described or of the polyimide foam described. The various layers here can comprise an identical foam or different foams which, though they are all melamine resin foams or polyurethane foams or polyimide foams, differ in their constitution (inter alia monomers and monomer ratios, additives, etc.), in their structure (e.g. cell size, cell wall lengths, proportion of closed cells), and/or in their properties (such as density, gas permeability, hardness, elasticity, compression behavior and rebound behavior, thermal insulation, sound absorption, etc.). It is preferable that all of the layers comprise an identical foam.

However, there are also possible composite elements which comprise two or more foams selected from melamine resin, polyurethane, and polyimide.

The number of layers (hereinafter also termed n) is preferably from 3 to 10, particularly preferably from 3 to 6, in particular from 3 to 5, and very particularly preferably 3 or 5. The arrangement has the at least three layers in succession, for example mutually superposed. Accordingly, the composite element has two outermost layers—if the element has a flat shape, therefore, an upper side and a lower side—and (n−2) internal layers.

According to the invention, at least one of the internal layers has recesses (cavities), and the two outermost layers have no recesses.

This gives, as one preferred embodiment, a composite element which has three layers A, B, and C, where the internal layer B has recesses and the external layers A and C have no recesses.

In another embodiment, the composite element has four layers A, B, C, and D, where at least one of the internal layers B and C has recesses, and the other layers (at least the external layers A and D) have no recesses. It is preferable that only one of the layers B and C has recesses, the other having none.

In another embodiment, the composite element has five layers A, B, C, D, and E, where at least one of the internal layers B, C, and D has recesses, and the other layers (at least the external layers A and E) have no recesses. It is preferable that two of the three layers B, C, and D have recesses, the others of these three layers having none.

Particular preference is given to a composite element which has five layers A, B, C, D, and E, where at least one of the internal layers B and D has recesses, and the other layers have no recesses. It is particularly preferable that the two internal layers B and D have recesses and the other layers have no recesses, thus giving a layer sequence without-with-without-with-without recesses.

If two or more layers in the composite element have recesses, the arrangement may preferably have—or may not have—one or more layers without recesses between these recess layers. In the latter case, i.e. in the case of two or more recess layers in direct succession, it is preferable that there is no overlap, or only a small degree of overlap, between the recesses of the individual layers.

According to feature i), the volume of the recesses in the internal layer having recesses is from 20 to 70% by volume, preferably from 25 to 60% by volume, and particularly preferably from 27 to 55% by volume. The balance of the proportion of 100% by volume of the layer is therefore composed of foam.

If the composite element has two or more layers with recesses, each of these recess layers complies with the feature i). The proportion of the recesses in the various recess layers here can be identical or different within the % by volume ranges mentioned.

The total thickness d of the composite element is the thickness across all of the foam layers and usually amounts to from 1 mm to 100 cm, preferably from 2 mm to 50 cm, and in particular from 5 mm to 20 cm.

According to feature ii), the thickness of the layer having recesses is from 20 to 80%, preferably from 30 to 75%, and particularly preferably from 35 to 70%, of the total thickness d of the composite element. If the composite element has two or more layers with recesses, this feature ii) relates to all of the recess layers taken together, i.e. the thicknesses of all of the recess layers are added to obtain a thickness $d^*$, and the quotient $d^*/d$ is calculated and has to be within the % range of feature ii).

The thickness ratio of the individual layers can vary widely and, for the ratio of layer with recesses:layer without recesses usually amounts to from 100:1 to 0.1:1, preferably from 5:1 to 1:1, and particularly preferably from 2:1 to 1:1. The at least two layers without recesses here can have identical or different thickness. By way of example, the thickness ratio of the two outermost layers can amount to from 5:1 to 1:1, preferably from 2:1 to 1:1. In one preferred embodiment, the thicknesses of the two outermost layers are identical. It is likewise preferable that in the case of the five-layer composite element mentioned with the layer sequence without-with-without-with-without recesses the thickness of the three layers A, C, and E without recesses is identical.

In the case of two or more recess layers, the thickness of these layers can likewise be identical or different. In the case of the five-layer element mentioned with the layer sequence without-with-without-with-without recesses, it is preferable that the two recess layers B and D are of identical thickness.

If the arrangement has a recess layer not central in the composite element, but closer to one surface of the composite element than to the other, as a result of the thicknesses of the individual layers or of the layer sequence, it is preferable that the recess layer faces away from the incident soundwaves.

Since the foam is an open-cell foam, the atmosphere surrounding the composite element, generally air, usually fills the recesses.

With regard to the three-dimensional shape of the recesses, it has been found that certain embodiments give the composite element particularly good properties, in particular good sound absorption. The shape of the recesses can be described two-dimensionally, by way of example, via their cross section, i.e. viewing a section running perpendicularly to the layers of the composite element, and via their plan view, i.e. viewing a section running parallel to the layers of the composite element. In the case of the cross section, the composite element is viewed from the side, and in the case of the plan view, it is viewed from above or from underneath.

The composite element is preferably one wherein the cross section of the recesses has a rectangular, square, U-shaped, trapezoidal, triangular, circular, or elliptical shape. U-shaped recesses correspond to a foamed surface with rounded protuberances.

It is preferable that the cross-sectional shape is rectangular, square, U-shaped or trapezoidal. It is particularly preferable that the cross section of the recesses has a rectangular or trapezoidal shape. In the case of the trapezoidal shape, the longer side of the trapezium can face toward or face away from the incident sound. Similarly, In the case of a U shape, the wider base of the recess (rather than the narrower tip) can face toward or face away from the incident sound.

If the cross section of a recess has a rectangular or trapezoidal shape, the ratio between the sides of the rectangle or trapezium preferably amounts to from 4:1 to 0.5:1, in particular from 2:1 to 1:1. In the case of a trapezium, the expression means the average side length. The arrangement of the recesses is preferably such that when the cross section of the composite element is viewed, the longest side of the rectangle or of the trapezium is parallel to the layers, i.e. the recesses preferably "lie flat" rather than "stand on edge".

The recesses can—preferably—extend over the entire thickness (height) of the recess layer or can extend only over a portion of the thickness.

The composite element is likewise preferably one wherein the recesses in plan view have a circular, oval, rectangular, square, or strip-like shape. A strip-like shape means that the recesses are "continuous" in the longitudinal or transverse direction of the composite element, i.e. the recess runs through the entire element in that direction.

The plan-view shape is preferably circular, rectangular, square, or strip-like. In the case of a rectangular recess, the ratio between the sides of the rectangle is preferably from 5:1 to 1:1.

If the recess is viewed in three dimensions, preference is given to recesses which have the shape of a parallelepiped, of a cube, of a cylinder, of a cone, of a frustum, of a sphere, or an ellipsoid, of a torus (ring), of a tetrahedron, of a truncated tetrahedron, of a pyramid, of a truncated pyramid, or of a depression (foam having rounded protuberances).

An example of a method for production of the inventive composite elements produces the individual layers separately from one another and then places them adjacent to one another. Layers composed of melamine resin foam in particular generally have fine acicular structures on their surface resulting from the production process; when the layers are mutually superposed, these acicular structures become interlocked with one another in the manner of a touch-and-close fastener. Layers composed of melamine resin foam are in particular preferably bonded to one another by this type of mutual superposition. The interlocking of the layers (and therefore the adhesion of the layers to one another) can, if necessary, be reinforced by applying pressure.

However, there are also other ways of bonding the layers to one another, for example via:

Adhesive bonding: adhesives (adhesion promoters) suitable for the purpose can be used during adhesion bonding, examples being single- or two-component adhesives or dispersion-based adhesives. Among the adhesives that can be used are those based on polychlorobutadiene, on polyacrylates, on styrene-acrylate copolymers, on polyurethanes, on epoxides, or on melamine-formaldehyde condensates. The adhesive can be applied to the foam via spraying, spreading, rolling, dipping, wetting, or other methods suitable for the purpose.

Pressing: the layers can also be bonded to one another via pressing. Multi-daylight presses, for example, or other conventional presses are suitable for this purpose, and the pressures, temperatures, and times used in the presses-are known per se.

Mechanical methods: mechanical methods can also be used to bond the layers to one another, examples being sewing, quilting, tacking (staples), needling, or riveting. Mechanical bonding is also possible without threads, staples, needles, rivets, or other aids, by utilizing the tough and resilient character of the foams and appropriately designing the shape of the foam layers. By way of example, the layers may have certain elements, e.g. undercuts, recesses, tongues, and/or pegs, which are used to clamp one layer to the other layer, or which, on insertion of one into another when the layers are pressed together, grip and keep the layers together.

The mutual superposition of the layers or their mechanical bonding have the advantage that layers can easily be separated from one another in the event of subsequent recycling of the composite element. It is preferable that the layers are bonded to one another via mutual superposition, or mechanically.

Instead of producing the layers separately from one another and, if appropriate, bonding them to one another as described above, a plurality of layers can be produced simultaneously via coextrusion or other suitable processes.

It is possible to bond two layers using a plurality of the bonding methods mentioned, and/or to use various bonding methods for production of the composite element.

In an example of a method for obtaining the layer having recesses (process I), a normal layer without recesses is first produced, and then the recesses are applied. Cutting, drilling, stamping, bombardment with projectiles, or other conventional methods can be used to apply the recesses, as a function of the constitution, hardness, and elasticity of the foam and of the shape of the recess. The cuffing or drilling here can be carried out conventionally using knives, drills, mills, or saws, or else by means of high-energy radiation, such as laser light (laser cuffing). Another possibility is cuffing or drilling by means of liquid (e.g. water) or gases (such as air), these being discharged at high pressure from a nozzle and dividing the foam.

As an alternative (process II), and, for example, if the volume of the recesses is in the upper region of the feature i), in a possible method of obtaining the layer having recesses, foam pieces are laid on the underlying layer (which may or may not have recesses), and then a layer (which again may or may not have recesses) is placed thereupon. By way of example, the foam pieces can be strips, parallelepipeds, cubes, cylinders, or rings. The separation of the foam pieces from one another here corresponds to the desired recesses, and the thickness (height) of the foam pieces corresponds to the thickness of the recess layer. The foam pieces can, if desired, be bonded as described above to the layer situated thereunder and/or to the layer situated thereover.

If the composite element comprises two or more recess layers, all of these can be produced by the same process I or II, or the two processes I and II can be used.

In one preferred embodiment, the composite element is one wherein at least one of the outermost layers has been hydrophobicized or oleophobicized, or (particularly preferably) has been both hydrophobicized and oleophobicized. It is very particularly preferable that the entire surface of the composite element has been hydrophobicized or oleophobicized, or (again particularly preferably) both hydrophobicized and oleophobicized. The term hydrophobicized covers water-resistant and waterproof, and the term oleophobicized covers oil-resistant and oilproof.

The possible method for the hydrophobicization or oleophobicization is that a hydrophobicizer and, respectively, oleophobicizer is used concomitantly before production of the foam is complete. It is also possible to treat the finished foam with the agent by, for example, wetting or coating the foam surface with the agent or saturating the foam with the agent.

Another successful method for hydrophobicization or oleophobicization laminates a hydrophobic and, respectively, oleophobic layer to one or more surfaces of the composite element. The lamination material is to be selected in such a way as to minimize impairment of the sound absorption of the composite element.

These laminating layers that can be used are in particular foils, e.g. polymer foils, and moreover fabrics or nonwovens composed of textile or glass fibers. The lamination material applied may be either hydrophobic or oleophobic, or—preferably—hydrophobic and oleophobic lamination materials may be applied on top of each other. The lamination material is usually bonded as described in the bonding methods at an earlier stage in the text above to the outermost foam layer, preferably via adhesive bonding or via pressing.

Suitable polymer foils are foils composed of polyamide, of polyolefins, e.g. polyethylene or polypropylene, or of polyesters, such as polyethylene terephthalate or polybutylene terephthalate. The total thickness of the foil is generally from 5 to 100 µm, preferably from 5 to 60 µm, and in particular from 10 to 20 µm.

Examples of suitable textile fibers for fabrics or nonwovens are cellulose fibers, polyester fibers, or polyamide fibers.

Examples of suitable hydrophobicizing agents are silicones, paraffins, silicone surfactants and fluorinated surfactants. Particularly suitable commercially available products are Dipolit®, a fluoroalkane emulsion from Rotta; Sitren®, a silicone emulsion from Degussa; and Persistol®, a paraffin emulsion from BASF, and similar products. Examples of suitable oleophobicizing agents are fluoroalkane emulsions, e.g. the commercially available Nuva® products from Clariant, the abovementioned Dipolit®, and similar products.

The hydrophobicizing agents or oleophobicizing agents mentioned can be used here for immediate treatment of the foam, or the agents can be used concomitantly during production of the lamination material, i.e. of the foils, textile layers, or glass fiber layers, or the agents can be applied to the lamination material.

One side of the inventive composite element, preferably the side facing away from the incident sound waves, can, if desired, have a stabilizing support layer. Examples of suitable support layers are those composed of metal, e.g. of aluminum or steel, of paperboard, of gypsum plasterboard, of plastic, or of other mechanically stable materials. The support layer can be a sheet of uninterrupted surface or can have recesses, for example taking the form of a perforated sheet or grid or net. A support layer having recesses can be preferred, since its saves weight and gives less impairment of the desired sound absorption.

The arrangement can also have the support layer in the interior of the composite element, i.e. there are foam layers located on the two sides of the support layer. This is advantageous particularly if sound impacts the composite element from both sides.

The composite element and/or its support layer can have mounting aids or fastening aids. These aids ease the attachment of a plurality of composite elements to one another to give a unitary surface, and the fastening of the composite elements to the substrate. Examples of suitable aids are adhesive areas, adhesive strips, or adhesive spots, screws or screw threads, rivets, snap connectors, clamps, interlocking connectors, or other aids. By way of example, they can be realized via holes, folds, fillets, grooves, cut-outs, or by means of molded-on tongues, pegs, straps, or the like.

The invention also provides the use of the composite elements described as sound-absorbing elements, for example on or in buildings, machines, or vehicles.

The inventive composite elements are better than those of the prior art. They feature low weight together with good sound absorption. If an inventive composite element is compared with a "solid" element without recesses, the reduction in sound absorption is less-than-proportional with respect to the reduction in weight by virtue of introduction of the recesses. If, for example, the weight of the element is reduced by ⅓ by virtue of the recesses, the sound absorption decreases by less than ⅓ when comparison is made with the element without recesses.

EXAMPLES

A melamine resin foam is used to produce multilayer composite elements (test specimens). The foam was a condensate derived from melamine and formaldehyde. The envelope density (to EN ISO 845) of this melamine-formaldehyde foam was 9 kg/m$^3$. The commercially available product Basotect® from BASF was used. Thickness below means the height of the cylindrical test specimen.

Test Specimen I: for Comparison

Solid cylinder of diameter 100 mm and thickness d 50 mm, without recesses.

Test Specimen II: Three-layer Composite Element with a Recess Layer

Cylinder of diameter 100 mm and total thickness d 50 mm with the following layer sequence:
first layer (outermost layer), thickness 10 mm, without recesses
second layer (internal layer), thickness 30 mm, with 19 cylindrical symmetrically arranged recesses of diameter 15 mm, the recesses having been obtained via drilling
third layer (outermost layer): thickness 10 mm, without recesses The layers were mutually superposed by hand and adhered to one another.

The cross section of the recesses was rectangular and the plan view of the recesses was circular. The volume of the recesses in the second layer amounted to 43% by volume of that layer. The thickness of the second layer amounted to 60% of the total thickness d.

Test Specimen III: Five-layer Composite Element With Two Recess Layers

Cylinder of diameter 100 mm and total thickness d 50 mm with the following layer sequence:
first layer (outermost layer), thickness 10 mm, without recesses
second layer (internal layer), thickness 10 mm, with 19 cylindrical symmetrically arranged recesses of diameter 15 mm, the recesses having been obtained via drilling
third layer (internal layer), thickness 10 mm, without recesses
fourth layer (internal layer), thickness 10 mm, with 19 cylindrical symmetrically arranged recesses of diameter of 15 mm, the recesses having been obtained via drilling
fifth layer (outermost layer): thickness 10 mm, without recesses.

The layers were mutually superposed by hand and adhered to one another.

The cross section of the recesses of the second and fourth layers was rectangular, and the plan view of the recesses was circular, and the arrangement had the recesses vertically over one another. The volume of the recesses in the second layer and in the fourth layer was in each case 43% by volume of that layer. The thickness of the second and fourth layers taken together amounted to 40% of the total thickness d.

Test Specimen IV: Three-layer Composite Element with Trapezoidal Recesses

Cylinder of diameter 100 mm and total thickness d 50 mm with the following layer sequence:
first layer (outermost layer), thickness 10 mm, without recesses
second layer (internal layer), thickness 30 mm, with 19 pyramid-shaped symmetrically arranged recesses; the recesses having been obtained via milling
third layer (outermost layer): thickness 10 mm, without recesses The layers were mutually superposed by hand and adhered to one another.

The cross section of the recesses was trapezoidal and the plan view of the recesses was square. The volume of the recesses in the second layer amounted to 30% by volume of that layer. The thickness of the second layer amounted to 60% of the total thickness d.

FIG. 1 is a diagram of a cross section of the test specimens I, II, III, and IV. The arrow indicates the side facing toward the sound waves (the loudspeaker, see FIG. 2).

The sound absorption of the test specimens was determined as sound absorption coefficient in an impedance tube to DIN EN ISO 10534-1 (October 2001). The test frequencies were 800, 1200, and 1600 Hz.

Figure 2:
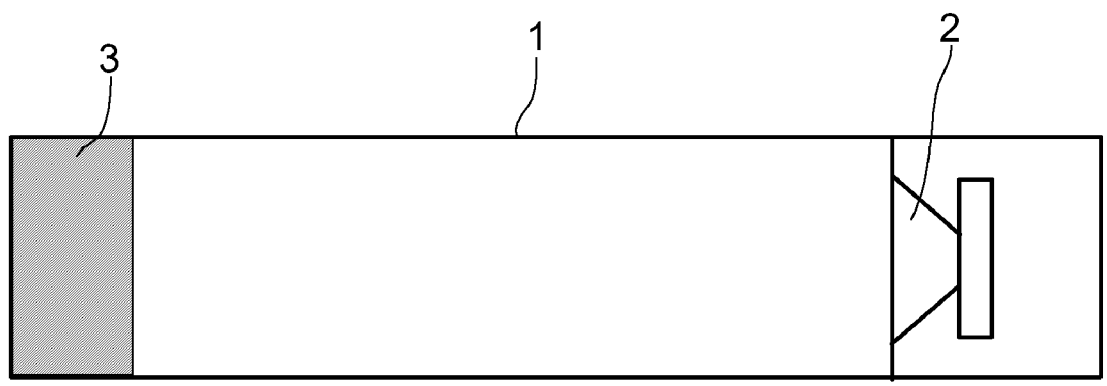

FIG. 2 is the diagram of the test arrangement with an impedance tube 1. There is a loudspeaker 2 at one end of the tube and at its other end there is a test specimen 3, i.e. the test specimen I, II, III, or IV. The loudspeaker 2 generates sound waves which impact the test specimen 3. The microphone is not shown.

The manner of placing of the test specimen in the impedance tube was such that the arrangement of the layers of the test specimen was perpendicular with respect to the axis of the impedance tube. The manner of placement of test specimen IV was such that the longer side of the cross-sectionally trapezoidal recess, i.e. the larger aperture of the recess, was facing toward the loudspeaker.

The table collates the results. The reference for the tests was the solid test specimen I (for comparison). The weight reduction achieved via the recesses in test specimens II, III, and IV in percent is based on test specimen I. The recesses reduced sound absorption when comparison was made with the solid test specimen I. The extent of that reduction is stated in percent, based on test specimen I.

TABLE

| Example | Test specimen | Weight reduction, based on test specimen I [%] | Reduction in sound absorption, based on test specimen I [%] at | | |
|---|---|---|---|---|---|
| | | | 800 Hz | 1200 Hz | 1600 Hz |
| 1 comp. | I | 0 | 0 | 0 | 0 |
| 2 | II | 33 | 21 | 14 | 6 |
| 3 | III | 22 | 1 | 5 | 4 |
| 4 | IV | 20 | 5 | 2 | 1 |

In the case of the three-layer test specimen II in Example 2, a weight reduction of 33% reduced the sound absorption by from 6 to 21%, as a function of sound frequency. The reduction in sound absorption was therefore less-than-proportional with respect to the weight reduction.

In the case of the five-layer test specimen III in Example 3, the sound absorption remained almost constant despite a weight reduction of 22%: the absorption decreased only by from 1 to 5%, therefore being markedly less-than-proportional. In the case of the three-layer test specimen IV with trapezoidal recesses (Example 4), the sound absorption likewise remained almost unaltered: it decreased by only from 1 to 5%, with a weight reduction of 20%.

The composite elements III and IV in particular, therefore, featured a considerable weight saving and this was not achieved at the expense of good sound absorption.

The invention claimed is:

1. A multilayer foam composite element whose total thickness d comprises at least three layers composed of an open-cell foam, where at least one of the internal layers has recesses and the two outermost layers have no recesses, wherein
    (i) the volume of the recesses in the internal layer having recesses is from 20 to 70% by volume,
    (ii) the thickness of the layer having recesses is from 20 to 80% of the total thickness d, and
    (iii) the composite element has a weight reduced by 20 to 22% by virtue of the recesses and a sound absorption decreased by 1 to 5% when comparison is made with the element without recesses.

2. The composite element according to claim 1, wherein the open-cell foam has been selected from a melamine resin foam, a polyurethane foam, and a polyimide foam.

3. The composite element according to claim 2, which has three layers A, B and C, where the internal layer B has recesses and the external layers A and C have no recesses.

4. The composite element according to claim 2, which has five layers, A, B, C, D, and E, where at least one of the internal layers B and D has recesses, and the other layers have no recesses.

5. The composite element according to claim 2, having two internal layers B and D, and wherein the two internal layers B and D have recesses, and the other layers have no recesses.

6. The composite element according to claim 2, wherein the cross section of the recesses has a rectangular, square, U-shaped, trapezoidal, triangular, circular, or elliptical shape.

7. The composite element according to claim 2, wherein the recesses in plan view have a circular, oval, rectangular, square, or strip-like shape.

8. The composite element according to claim 1, which has three layers A, B and C, where the internal layer B has recesses and the external layers A and C have no recesses.

9. The composite element according to claim 8, wherein the cross section of the recesses has a rectangular, square, U-shaped, trapezoidal, triangular, circular, or elliptical shape.

10. The composite element according to claim 8, wherein the recesses in plan view have a circular, oval, rectangular, square, or strip-like shape.

11. The composite element according to claim 1, which has five layers, A, B, C, D, and E, where at least one of the internal layers B and D has recesses, and the other layers have no recesses.

12. The composite element according to claim 11, wherein the two internal layers B and D have recesses, and the other layers have no recesses.

13. The composite element according to claim 11, wherein the cross section of the recesses has a rectangular, square, U-shaped, trapezoidal, triangular, circular, or elliptical shape.

14. The composite element according to claim 1, having two internal layers B and D, and wherein the two internal layers B and D have recesses, and the other layers have no recesses.

15. The composite element according to claim 14, wherein the cross section of the recesses has a rectangular, square, U-shaped, trapezoidal, triangular, circular, or elliptical shape.

16. The composite element according to claim 1, wherein the cross section of the recesses has a rectangular, square, U-shaped, trapezoidal, triangular, circular, or elliptical shape.

17. The composite element according to claim 1, wherein the recesses in plan view have a circular, oval, rectangular, square, or strip-like shape.

18. The composite element according to claim 1, wherein at least one outermost layer has been hydrophobicized or oleophobicized, or has been both hydrophobicized and oleophobicized.

19. The composite element according to claim 1, wherein the entire surface of the composite element has been hydrophobicized or oleophobicized, or has been both hydrophobicized and oleophobicized.

20. A sound-absorbing element comprising the multilayer foam composite element according to claim 1.

* * * * *